United States Patent [19]

Loria et al.

[11] Patent Number: 4,880,465
[45] Date of Patent: Nov. 14, 1989

[54] OPAQUE INK COMPOSITION CONTAINING HOLLOW MICROSPHERES FOR USE IN INK JET PRINTING

[75] Inventors: Adrian Loria, Wilmette; Josephine Aguilar, Elk Grove Village, both of Ill.

[73] Assignee: Videojet Systems International, Inc., Elk Grove Village, Ill.

[21] Appl. No.: 23,196

[22] Filed: Mar. 9, 1987

[51] Int. Cl.$^4$ .................. C09D 11/02; C08J 9/32
[52] U.S. Cl. ........................ 106/20; 106/30; 523/218
[58] Field of Search ............ 106/20, 30; 523/218; 524/379

[56] References Cited

U.S. PATENT DOCUMENTS

| | | | |
|---|---|---|---|
| 3,654,193 | 4/1972 | Siener | 106/308 M |
| 3,951,899 | 4/1976 | Siener | 524/563 |
| 4,007,141 | 2/1977 | Wismer et al. | 521/54 |
| 4,089,800 | 5/1978 | Temple | 106/308 M |
| 4,207,577 | 6/1980 | Mansukhani | 346/75 |
| 4,365,035 | 12/1982 | Zabiak | 524/497 |
| 4,389,503 | 6/1983 | Maxwell et al. | 523/218 |

OTHER PUBLICATIONS

Derwent Abstracts, AN 81-70006D/39, "Printing Ink and Paint Compositions", German Patent DE 3008390-A, 9/17/81.
Derwent Abstracts, An 83-846878/51, "Flexo-Type Encapsulated Ink", Japanese Patent J58191771-A, 11/9/83.
Now Ropaque TM OP-42, Rohm and Haas, Oct. 1981.
Material Safety Data Sheet for Ropaque TM OP-42, 3/24/86, Rohm and Haas.
Chem. Abs. 73:67772d.
Chem. Abs. 93:48615b.

Primary Examiner—Paul Lieberman
Assistant Examiner—Christine A. Skane
Attorney, Agent, or Firm—Robert F. Green

[57] ABSTRACT

A non-pigmented ink suitable for use in ink jet printing is disclosed. The ink comprises a resin component, hollow microspheres, and a suitable carrier vehicle. The hollow microspheres contain a central void region filled with a liquid capable of diffusing through the walls of said microspheres and have an inside diameter from about 0.1 to about 0.5 micron and an outside diameter from about 0.4 to about 1 micron.

13 Claims, No Drawings

OPAQUE INK COMPOSITION CONTAINING HOLLOW MICROSPHERES FOR USE IN INK JET PRINTING

This invention relates to a non-pigmented ink composition that dries opaque, particularly to a composition that dries opaque white, or opaque yellow. The ink composition is suitable for use in high speed ink jet printing systems.

BACKGROUND OF THE INVENTION

Ink jet printing is a well known technique by which printing is effected without contact between the printing device and the substrate on which the printed characters are deposited. Briefly described, ink jet printing involves the technique of projecting a stream of droplets of ink to a surface and controlling the direction of the stream electronically so that the droplets are caused to form the desired printed image on the substrate. That technique of non-contact printing is particularly well suited for application of characters onto irregularly shaped surfaces, including, for example, the bottom of beverage containers.

As is also well known in the art, the physical characteristics of an ink jet printing ink must be carefully controlled. For example, the ink must flow through the fine jet nozzles without causing clogging. This requires the inks to be of a specific, uniform viscosity. Further, ink jet printing inks must be quick drying and smear resistant and must provide good wettability of the substrate.

Acceptable colored inks have heretofore been formulated to contain, for example, a colorant such as a dye or pigment, a resin binding agent which serves to secure or adhere the colorant to the substrate surface, and a carrier fluid or solvent for the colorant or binding agent. The carrier fluid evaporates upon application of the ink. Some colored inks have also contained ancillary agents such as evaporation retardants, resistivity control agents, and other conventional components.

While acceptable colored inks have existed for use in ink jet printing, a need has continued to exist for an acceptable white jet ink.

A white jet ink must form an opaque layer on the surface of the substrate. Those skilled in the ink jet printing ink art have known that one can use particulates (pigments) to achieve such opaqueness. Titanium dioxide ($TiO_2$) is a pigment which has been used in such white jet inks, without great success.

An ink jet printing ink composition containing particulates presents special problems For example, the particulates must be ground to have a microscopic diameter, preferably about 4 microns, so that the particulates do not plug the small printer orifices. The particles also must not agglomerate, as agglomeration would cause plugging of the printer orifices and irregular droplet formation. The small size is also necessary to assure that uniform ink droplets are reliably formed in the ink jet printers.

Another undesirable characteristic of pigment particulates is that they settle-out over time. Such settling causes the nozzles to clog, results in unacceptable variation in print density and, hence, causes the ink to have a poor shelf life.

White inks have been made heretofore without pigments, but such non-pigmented inks have not had a satisfactory balance in evaporation properties to achieve the blushing effect needed to enhance the opaque image. Further, the non-pigmented white inks known to date have not been able to maintain a stable, high quality opaque image and excessive variation in the quality of the opaque image has resulted.

U.S. Pat. No. 4,389,503, for example, discloses non-pigmented liquid inks which dry to a reticulated film structure containing microvoids which scatter light incident thereto. Such a composition relies on the fact that after its application to a substrate the solvent/non-solvent ratio of the carrier vehicle shifts so that the deposited ink becomes rich in non-solvent and deficient in solvent for the cellulose ester film forming agent. In effect, what is known as phase-inversion occurs, causing the formation of a film having a plurality of microvoids. One of the problems associated with this ink is that the proper formation of the microvoids is critically dependent upon the conditions under which the ink is deposited. Further, because a delicate balance between the solvent/non-solvent ratio must be retained, the composition must be stored and used only under tightly controlled conditions. This prevents the ink from maintaining the ink solvent balance necessary to maintain a stable image; excessive variation in the quality of the opaque image results.

It is an object of this invention to provide improved non-pigmented jet ink compositions, suitable for use with jet ink printing techniques to provide opaque films.

It is another object of this invention to provide improved non-pigmented jet ink compositions that dry opaque white and which are suitable for use on metal, glass and other non-porous substrates.

Still another object of this invention is to provide a jet ink that dries opaque white which has good stability and shelf life.

It is yet another object of this invention to provide an opaque jet ink composition that is nonsettling and of good opaque print quality.

These and other objects of the invention will be better understood from a reading of the detailed description of the invention, a summary of which follows.

SUMMARY OF THE INVENTION

The present invention provides a non-pigmented ink suitable for use in ink jet printing. The ink comprises (a) from about 2 to about 20 percent of a resin component (b) from about 5 to about 25 percent of hollow microspheres, and (c) the remainder being a suitable carrier vehicle. The carrier vehicle typically contains water, ammonium hydroxide, a volatile solvent, and a specific gravity controlling agent.

The hollow microspheres used in the ink formulation contain a central microvoid region which is filled with liquid. The walls of said microspheres are permeable to said liquid and are comprised of a synthetic polymeric material, and have an inside diameter from about 0.1 to about 0.5 micron and an outside diameter from about 0.4 to about 1 micron. The carrier vehicle, the resin component, and the hollow microspheres are chemically nonreactive with each other and the specific gravity of the carrier vehicle is about equal to or greater than the specific gravity of the microspheres.

The ink is characterized in that after application to a suitable substrate, the liquid within the microspheres diffuses through the walls of the microspheres, leaving microvoids filled with air. Thus, the ink, upon drying, forms a coating laden with microscopic air filled microvoids which effectively scatter light incident thereupon, causing an opaque image to be produced.

DETAILED DESCRIPTION OF THE PREFERRED EMBODIMENTS

As indicated, the present invention overcomes the disadvantages of the white inks used heretofore in ink jet printing. Because the microvoids which are present in the hollow microspheres are uniform and not dependent upon the environmental conditions used during printing, or upon other extrinsic factors, the resultant print quality is consistently uniform.

Of great significance is the fact that the inks of the present invention are storage stable. Thus, the problems with the prior art pigmented white ink formulations have been overcome by the present invention. No pigment is used in the present formulation and the hollow microspheres are maintained in a uniform dispersion throughout the ink, because the specific gravity of the ink carrier vehicle is about equal to or greater than the specific gravity of the hollow microspheres. Thus, the hollow microspheres do not have a tendency to settle out of the suspension or dispersion. The quality of the ink remains uniform throughout an entire printing cycle, even in the absence of any mechanical agitation or other means for mechanically maintaining the hollow microspheres in dispersion.

The hollow microspheres which are used in the present invention may be obtained commercially. Such microspheres are known in the art and may be obtained from a variety of sources. Ropaque OP-42, by Rohm and Haas Company, is a commercially available product which is an aqueous dispersion containing 40%, by weight, of hollow microspheres of an acrylic/styrene copolymer. The microspheres have an inside diameter of about 0.3 micron and an outside diameter of about 0.5 micron and are filled with water.

Such microspheres may be obtained as a result of the method described in U.S. Pat. No. 4,089,800. The microspheres may be made of virtually any organic polymer and may be either thermoplastic or thermosetting. Useful thermoplastic resins of which the hollow microspheres may be formed include cellulose derivatives, acrylic resins, polyolefins, polyamides, polycarbonates, polystyrene, copolymers of styrene and other vinyl monomers, vinyl polymers such as homo- or copolymers of vinyl acetate, vinyl alcohol, vinyl chloride, vinyl butyral, and homo- and copolymers of dienes. Particularly useful thermoplastic polymers include copolymers such as 2-ethylhexylacrylate, methyl methacrylate and copolymers of styrene with other vinyl monomers such as acrylonitrile.

Useful thermosetting resins of which the hollow microspheres may be comprised include inter-polymers of hydroxyl esters of ethylenically-unsaturated monomers, typically admixed with a crosslinking agent, such as an aminoplast resin. Other thermosetting resins which may be used include admixtures of alkyl resin which may also be employed with cross linking agents.

Of particular significance with respect to the hollow microspheres of the present invention is that said microspheres in fact are hollow. Thus, microspheres which do not contain the microvoid are not suitable. This is particular true in view of the fact that it is believed that one of the mechanisms by which the present inks are successful as white inks for use in ink jet printing is that the hollow microspheres are dispersed throughout the coating which results after evaporation of the solvent upon application of the ink to a suitable substrate. The microspheres act to effectively scatter light which is incident thereupon, producing the opaque image. Preferably the hollow microspheres have an inside diameter from about 0.2 to about 0.4 micron and an outside diameter from about 0.5 to about 0.7 micron.

The resinous component of the ink composition of the present invention is not critical, except that it should not react chemically with the hollow microspheres and must be at least dispersible in the carrier vehicle. Except for those two criteria, the binder component is not critical. The purpose of the binder component is, among others, to promote the adhesion of the ink formulation on the printing surface. The resinous component preferably is present as a resin emulsion or dispersion, as distinguished from a resin solution, since resin solutions tend to have too high viscosity at the desired resin loading in the ink. To be suitable for ink jet printing, the viscosity of the ink must be maintained below a level at which problems in printing begin to occur, such as stream break off and drop separation.

Typically the resin is a highly water dispersible resin, and usually is a thermoplastic resin which also functions as a bonding agent.

Typical resin components include styrene-acrylic copolymer resins. Usually, the styrene-acrylic acid copolymer is water saponifiable, thus having some solubility in water. Specific resins believed to be suitable in the inks of the present invention include Joncryl 682, 52, 120, 134, and 142, styrene/acrylic resins, manufactured by Johnson Wax S.C., Johnson & Johnson, Inc.; Lucidene styrene/acrylic resin manufactured by Morton Chemical Co. division of Morton Norwich Products Inc.; Roplex AC-417, AC-829, and AC-64 styrene/acrylic resin manufactured by Rohm and Haas Co.; PVP K 15, polyvinyl pyrrolidone manufactured by GAF Chemicals; Pentalyn 261, Dresinol 210 B, Natrosol, and Klucel rosin derivatives manufactured by Hercules Inc.; Scripset 550, modified polystyrene manufactured by Monsanto Co.; and Meoprene Latex 115, synthetic rubber manufactured by Du Pont.

The present formulation also contains a lower alkanol. The lower alkanol may be, for example, methanol, ethanol, propanol, isopropanol, n-butanol or the like. The only restriction placed upon the lower alkanol is that it also must not react with the hollow microspheres to degrade them in any manner. Also, the lower alkanol should not be reactive with the binder component which is present in the formulation.

The lower alkanol functions in the ink formulation to speed drying of the applied ink and improves the wettability of the ink for some surfaces. The amount of alcohol used in the formulation will depend in part upon the surface to be printed. Usually the lower alkanol will be present in an amount from about 1 to about 20 percent, based on the total weight of the ink. In place of the lower alkanol, other water miscible solvents which are compatible with the resin and with the hollow microspheres may be employed.

Ammonium hydroxide is usually employed for pH control of the ink composition. The pH is dependent upon the particular resin and other components which are employed. However, typically the pH will be from about 7 to about 9 and the desired pH is obtained through adjustment with the ammonium hydroxide. Because the ammonium hydroxide is also an ionizable material it is also capable of imparting conductivity to the ink, bringing the resistivity down below 2000 ohm-cm and into the operating range for proper ink drop charging for jet printing. Also, upon evaporation, the ammonia allows the resin in the applied ink to achieve its maximum water resistance.

The inks of the present invention usually contain a coalescent agent such as carbitol which also functions as an additional solvent for the resin component. Other glycol ethers and their derivatives or other functionally equivalent components can be used instead of carbitol.

The inks of the present invention may also contain other components such as plasticizers which aid water resistance and abrasion resistance of the printed image, defoamers which reduce foaming during processing of the ink in both preparation and use, viscosity control agents, and the like.

The ink of the present invention preferably has a viscosity at 25° C. from about 3 to about 10 centipoises, an electrical resistivity from about 100 to about 3500 ohm-cm, and a sonic velocity from about 1300 to about 1700 meters/sec. Most preferably, the ink of the present invention has a viscosity at 25° C. from about 3 to about 6 centipoises, an electrical resistivity from about 100 to about 1000 ohm-cm and a sonic velocity from about 1500 to about 1700 meters/sec. Electrolytes can be added to adjust the specific resistivity of the ink. Usable electrolytes include dimethylamine hydrochloride, sodium propanate, and sodium acetate.

It is desirable that the microspheres not settle out. For this reason, the ink vehicle in which microspheres are suspended must have a specific gravity about equal to or greater than the specific gravity of the microspheres. A specific gravity adjusting agent such as glycerol can be used to increase the specific gravity of the carrier vehicle, if it is necessary to do so.

The ink formulations of the present invention are not limited to opaque white, but colored inks are also included. Colorants may be added to the formulation, such as Diarylide Yellow, Acid Yellow 13, Solvent Yellow 13, Acid Green 73, Solvent Red 125, Acid Green 73, Solvent Red 25, Acid Yellow 166, Acid Blue 260, Acid Blue 229 and Acid black 52.

The ink is capable of printing on porous and non-porous substrates with good opacity and adhesion.

The following non-limiting examples further illustrate the present invention.

EXAMPLES 1-3

Ink compositions were formulated by combining the ingredients set forth below. The specific gravities of the inks are also set forth below, and are compared to the specific gravity of the vehicle alone and the specific gravity of the hollow microspheres.

| | Parts by Weight | | |
|---|---|---|---|
| | Example 1 | Example 2 | Example 3 |
| Ropaque OP-42 (40% Solid) | 35.0 | 32.5 | 31.0 |
| D.I. water | 39.0 | 37.0 | 35.4 |
| Ammonia (28% NH3) | 3.0 | 2.8 | 2.7 |
| Carbitol | 3.0 | 2.8 | 2.7 |
| Joncryl 52 (60% Solid) | 15.0 | 13.8 | 13.3 |
| Isopropanol | 5.0 | 5.1 | 4.9 |
| Glycerol | — | 6.0 | 10.0 |
| | 100.0 | 100.0 | 100.0 |
| Specific Gravities | | | |
| Ropaque OP-42 | 1.027 | 1.027 | 1.027 |
| Vehicle | 1.01 | 1.029 | 1.034 |
| Ink | 1.018 | 1.029 | 1.034 |

EXAMPLE 4

To demonstrate the utility of using hollow microspheres in the formulation of the present invention in contrast to a formulation using microspheres which are not hollow, the following experiment was conducted.

A sample of a printing ink was obtained from a third party, which contained essentially solid microspheres in a conventional ink jet formulation. The microspheres were approximately 0.5 to 0.6 microns in size and were dispersed throughout the formulation. No other opacifying agent or pigment was present in the sample.

The solid microsphere ink which at the time of testing was approximately 4 years old was compared with the ink of Example 1. The solid microsphere ink and the ink of Example 1 were printed on a coated paper stock in a Videojet ® 9000 printer. The printed dots were scanned on an E G & G Scanning Microline Densitometer Apparatus, giving a dot profile of the inks on graph paper.

Since the ink was white opaque and the substrate was black, testing was done on the reflection in an inverse mode. The black substrate was used as the background and the light reflection of the white ink dots was measured. The resultant response curves gave negative traces which were used to compare the inks under identical conditions.

Calibration of the graph paper was 10 cm.=1.00 optical density. Therefore, a negative deflection of 7.5 cm. was equal to −0.75 optical density. With the comparison ink producing 6 cm. or −0.6 optical density it was determined that the ink of Example 6 exhibited −0.15 optical density units and was therefore more opaque, by a substantial margin.

From this comparison, it is clear that by the use of hollow microspheres, the present invention is capable of achieving a high quality white ink image on desired substrates which could not be achieved with the ink containing solid microspheres.

It will be understood that various changes and modifications can be made to the formulation of the present invention without departing from the spirit of the invention, especially as defined in the following claims.

What is claimed is:

1. A nonpigmented ink suitable for use in ink jet printing comprising:
 (a) from about 2 to about 20 percent by weight of a resin component;
 (b) from about 5 to about 25 percent by weight of hollow microspheres; and
 (c) the remainder being a suitable carrier vehicle comprised of water, ammonium hydroxide, and a volatile solvent; all percentages being based upon the total weight of the ink; the hollow microspheres having permeable walls comprised of a synthetic polymeric material, a central void region filled with water, capable of diffusing through the walls of said microspheres, an inside diameter from about 0.1 to about 0.5 micron and an outside diameter from about 0.4 to about 1 micron; the resin component, the hollow microspheres and the carrier vehicle being chemically nonreactive with each other; and the specific gravity of the ink being about equal to or greater than the specific gravity of the microspheres wherein, the ink has a viscosity at 25 degrees C. from about 3 to about 10 centipoises, an electrical resistivity from about 100 to about 3500 ohm-cm, and a sonic velocity from about 1300 to about 1700 meters/second.

2. The ink of claim 1 wherein the volatile solvent is a lower alkanol and is present in an amount from about 1 to about 20 percent, based on the total weight of the ink.

3. The ink of claim 2 wherein the hollow microspheres have an inside diameter from about 0.2 to about 0.4 micron and an outside diameter from about 0.5 to about 0.7 micron.

4. The ink of claim 3 wherein the hollow microspheres have walls comprised of an acrylic/styrene copolymer.

5. The ink of claim 1 wherein the resin is an acrylic/styrene copolymer.

6. The ink of claim 2 wherein the ink has a viscosity at 25° C. from about 3 to about 6 centipoise, an electrical resistivity from about 100 to about 1000 ohm-cm, and a sonic velocity from about 1500 to about 1700 meters/sec.

7. The ink of claim 6 wherein the pH is from about 7 to about 9.

8. The ink of claim 7 also comprising a coalescent agent.

9. The ink of claim 8 wherein the coalescent agent is selected from the group consisting of carbitol and glycol ethers.

10. The ink of claim 2 also comprising a plasticizer and a defoaming agent.

11. The ink of claim 10 wherein the ink has a viscosity at 25° C. from about 3 to about 6 centipoise, and electrical resistivity from about 100 to about 1000 ohm-cm, and a sonic velocity from about 1500 to about 1700 meters/sec.

12. The ink of claim 11 wherein the hollow microspheres have permeable walls comprised of a polymer selected from the group consisting of 2-ethylhexylacrylate, methyl methacrylate and copolymers of styrene and a vinyl monomer 13. The ink of claim 1 wherein the microspheres have an inside diameter of about 0.3 micron and an outside diameter of about 0.5 micron and are filled with water.

* * * * *